United States Patent [19]

Takasu et al.

[11] 4,452,205
[45] Jun. 5, 1984

[54] METHOD AND APPARATUS FOR CONTROLLING IGNITION TIMING IN AN INTERNAL COMBUSTION ENGINE

[75] Inventors: Yasuhito Takasu, Toyohashi; Katsuharu Hosoe, Kariya; Toshiharu Iwata, Aichi, all of Japan

[73] Assignee: Nippondenso Co., Ltd., Kariya, Japan

[21] Appl. No.: 481,235

[22] Filed: Apr. 1, 1983

[30] Foreign Application Priority Data

Apr. 2, 1982 [JP] Japan ................................ 57-55700

[51] Int. Cl.$^3$ .............................................. F02B 5/04
[52] U.S. Cl. ..................................... 123/419; 123/417
[58] Field of Search ................ 123/436, 419, 417, 406

[56] References Cited

U.S. PATENT DOCUMENTS

| | | | |
|---|---|---|---|
| 3,596,643 | 8/1971 | Schweitzer | 123/419 |
| 4,026,251 | 5/1977 | Schweitzer | 123/419 |
| 4,379,333 | 4/1983 | Ninomiya | 364/431.05 |
| 4,389,992 | 6/1983 | Shigematsu | 123/419 |

*Primary Examiner*—Ronald B. Cox

*Attorney, Agent, or Firm*—Cushman, Darby & Cushman

[57] ABSTRACT

Engine parameters are detected to set a basic ignition timing, and this basic ignition timing is forcibly changed to effect feedback control in which engine output is detected for finding an optimum ignition timing. Engine is operated with a plurality of different ignition timings, where the number of the ignition timings is at least two, and engine output data for each ignition timing is measured to find which ignition timing causes a higher engine output. Thus, one of the plurality of ignition timings, which gives the lowest engine speed is replaced with a new ignition timing with which the engine produces higher output. The new ignition timing is computed in such a manner that the new ignition timing is located at a point opposite to the ignition timing giving the lowest engine output with respect to an average ignition timing, while the difference between the average value and the new ignition timing equals a multiple of the difference between the ignition timing giving the lowest engine speed and the average value. In this way the ignition timing is renewed successively for finding the optimum ignition timing.

7 Claims, 11 Drawing Figures

FIG. 7

| FIG. 7A |
|---------|
| FIG. 7B |

FIG. 7A

- 100 — INTERRUPT SERVICE ROUTINE
- 101 — CALCULATE BASIC ADVANCE ANGLE $\theta_B$ FROM ENGINE PARAMETERS
- 102 — ENGINE IN STEADY STATE?
  - yes →
    - 109 — $\Theta = \theta_B + \theta_L$
    - 110 — $Cf = Cf + 1$
    - 111 — $Cf > Cfend$?
      - yes →
        - 112 — STORE np IN MEMORY
        - 113 — $Cf = 0$, $np = 0$, $i = i + 1$
      - no →
        - 117 — $Cf > Cfo$?
          - no →
  - no →
    - 103 — $i = 0$, $Cf = 0$, $np = 0$, $KEY = 0$
    - 104 — SET IGNITION TIMING $\Theta = \theta_B + \theta_L$
    - 105 — RETURN

METHOD AND APPARATUS FOR CONTROLLING IGNITION TIMING IN AN INTERNAL COMBUSTION ENGINE

BACKGROUND OF THE INVENTION

This application is related to Co-pending U.S. application Ser. No. 159,435 filed on July 13, 1980 assigned to Nippondenso Co., Ltd., now U.S. Pat. No. 4,379,333.

This invention relates generally to ignition timing control in an internal combustion engine of a vehicle or the like, and more particularly the present invention relates to method and apparatus for controlling ignition timing so that ignition timing is optimum to obtain the highest engine output and to result in minimum fuel consumption.

In an internal combustion engine, the ignition timing is generally determined so that engine output is maximum and fuel consumption is minimum from engine parameters such as engine rotational speed and intake pressure or intake airflow. However, an ignition timing determined in this way is not necessarily ideal because of variations existing from the time of manufacturing or caused by secular change or climate change. Therefore, when a given ignition timing is set, the resultant engine output sometimes cannot be high enough as expected when ideal or optimum ignition timing is set.

SUMMARY OF THE INVENTION

The present invention has been developed in order to remove the above-described drawbacks inherent to the conventional method and apparatus for controlling ignition timing in an internal combustion engine.

It is, therefore, an object of the present invention to provide a method and apparatus with which ignition timing of an internal combustion engine is selected so that resultant engine output is maximum and fuel consumption is minimum.

In order to find an optimum ignition timing, ignition timing or its correction amount is forcibly changed to effect feedback control in which engine output is detected. Engine is operated with a plurality of different ignition timings, where the number of the ignition timings is at least two. An average value of the plurality of ignition timings is calculated, and one of the ignition timings giving the lowest engine output is detected. A new ignition timing is computed by using the average value and the ignition timing giving the lowest engine output so that engine output increases. Then the ignition timing giving the lowest engine output is replaced by the new ignition timing so that the engine is again operated with a plurality of ignition timings including the new ignition timing to further renew the ignition timing if necessary.

According to a feature of the present invention the new ignition timing is computed in such a manner that the new igntion timing is located at a point opposite to the ignition timing giving the lowest engine output with respect to the average ignition timing, while the difference between the average value and the new ignition timing equals a multiple of the difference between the ignition timing giving the lowest engine speed and the average value.

BRIEF DESCRIPTION OF THE DRAWINGS

The object and features of the present invention will become more readily apparent from the following detailed description of the preferred embodiment taken in conjunction with the accompanying drawings in which:

FIGS. 7A and 7B are flow charts showing the operational steps executed by the computer included in the ignition timing control circuit of FIG. 5. The same or corresponding elements and parts are designated at like reference numerals throughout the drawings.

DETAILED DESCRIPTION OF THE INVENTION

Prior to describing the preferred embodiment of the present invention, the principle or concept of the invention, namely, the way of finding an optimum ignition timing will be described with reference to FIGS. 1, 2A to 2D and 3.

Figure 1:
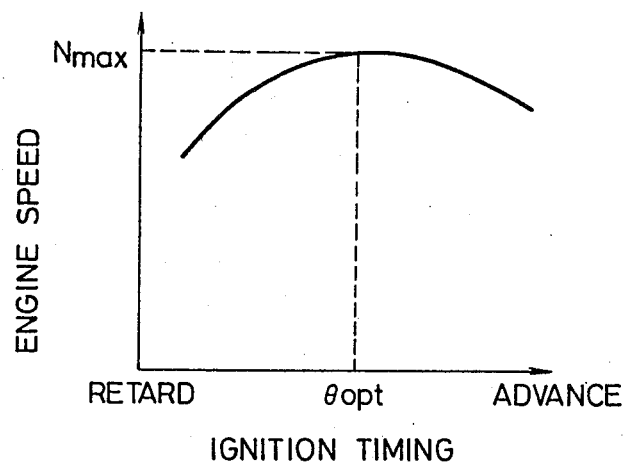
FIG. 1 is a graph showing the relationship between ignition timing and engine rotational speed.

FIG. 1 shows the general relationship between the ignition timing expressed in terms of an advance angle, and an engine rotational speed in a single cylinder engine. As will be understood from FIG. 1, the curve has a peak point showing the maximum engine speed Nmax. An ignition timing providing the maximum engine speed Nmax is referred to as an optimum ignition timing or peak point $\theta_{opt}$. In other words, the ignition timing should be set to the optimum value $\theta_{opt}$ to obtain the highest engine speed Nmax or output.

Figure 2A:
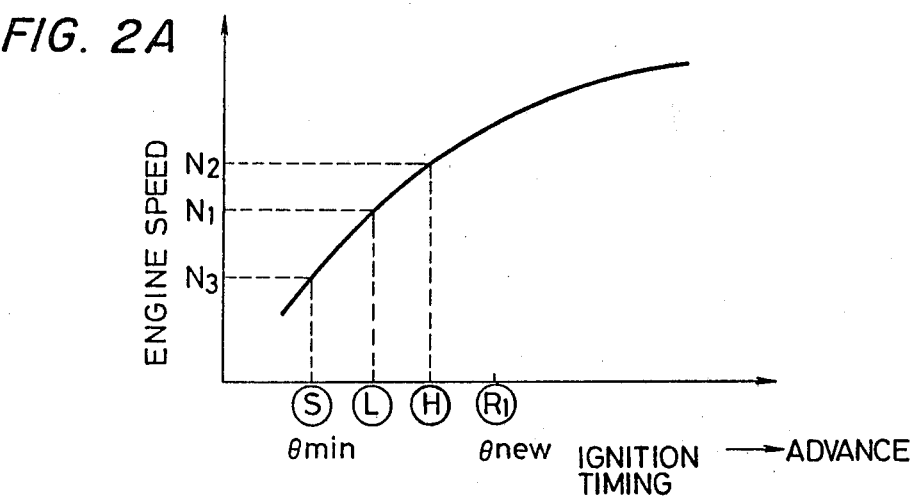
FIGS. 2A, 2B and 2C are explanatory diagrams showing the process of renewing an ignition timing for finding an optimum ignition timing which gives the highest engine output.
Figure 2B:
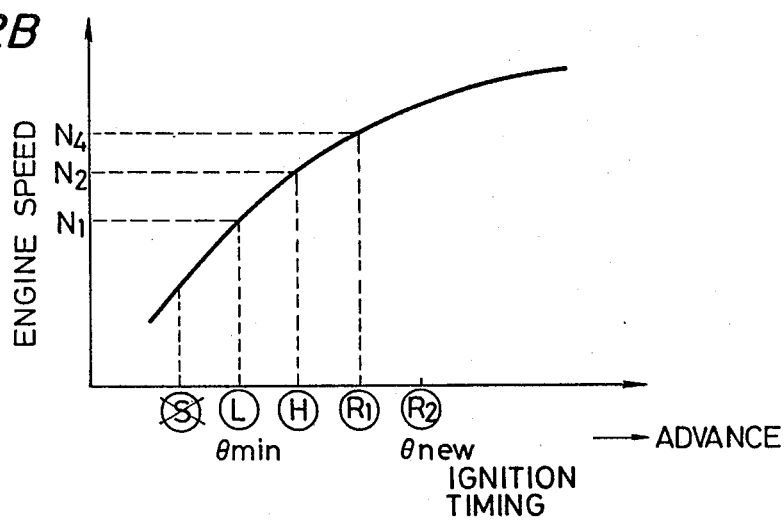
Figure 2C:
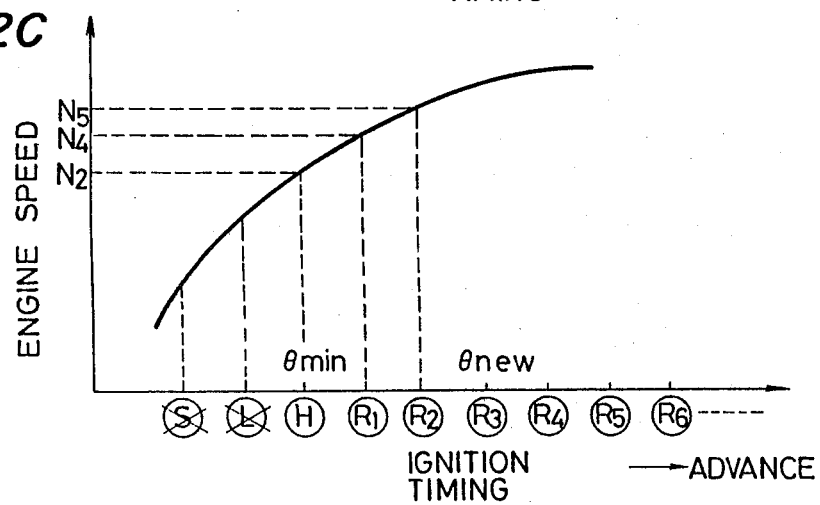

Reference is now made to FIGS. 2A, 2B and 2C which show the way of renewing ignition timing so that engine output increases. Diagrams of FIGS. 2A to 2C are graphs showing the relationship between ignition timing in terms of an advance angle $\theta$ and engine speed N. The advance angles plotted along the x distance are correction amounts or angles which are added to a basic ignition timing $\theta_B$ which is determined by the intake airflow or intake air pressure and engine speed. Namely, the origin of the co-ordinate does not equal zero but equals this basic ignition timing $\theta_B$.

It is assumed that the ignition timing of an internal combustion engine is at a point L ($\theta_L$) in FIG. 2A. The engine is operated with such an ignition timing $\theta_L$ for a predetermined period of time, for instance a period corresponding to 20 revolutions of the engine crankshaft. Let us put engine speed resulted from engine operation with the ignition timing $\theta_L$ as N1. Then the engine is operated with another ignition timing point H, for instance $\theta_L + \Delta\theta_1$, and it is assumed that engine speed resulted therefrom is expressed in terms of N2. Furthermore, the engine is operated with another ignition timing point S, for instance $\theta_L + \Delta\theta_2$, and it is assumed that engine speed resulted therefrom is expressed in terms of N3. These three ignition timings L, H and S will be referred to as initial ignition timings hereafter. Summarizing the engine operation described in the above, the relationship between various ignition timings and engine speed data are shown in the following TABLE.

TABLE

| POINT ON FIGS. 2A, 2B & 2C | L | H | S | AVERAGE $\bar{\theta}$ |
|---|---|---|---|---|
| IGNITION TIMING | $\theta_L$ | $\theta_L + \Delta\theta_1$ | $\theta_L + \Delta\theta_2$ | $3\theta_L + \Delta\theta_1 + \Delta\theta_2/3$ |
| ENGINE SPEED | N1 | N2 | N3 | |

In the above, although the engine is operated three times with three different ignition timings L, H and S, the number of ignition timings for engine operation may be other than three as long as it is more than one.

After the engine has been operated three times as shown in the TABLE, an average value $\bar{\theta}$ of the three initial ignition timings is computed. Then it is detected which point gives the lowest engine speed among these three ignition timings. In the illustrated example, the point S giving the lowest engine speed N3 will be found.

Since this ignition timing S is most undesirable among the three different ignition timings L, H and S, the point S is renewed to a new ignition timing in the following manner. Namely, a new point will be found so that engine speed increases. This renewal is effected such that the new point is found at a point opposite to the point giving the lowest engine speed with respect to the point of the above-mentioned average ignition timing $\bar{\theta}$. This new point is denoted as R1 and the new ignition timing defined by the point R1 is denoted as $\theta_{new}$.

After the new point R1 has been found, the engine is operated with the new ignition timing $\theta_{new}$, and it is assumed that engine speed data N4 is obtained as the result. This new engine speed data N4 is substituted for the minimum or lowest engine speed data N3 as shown in FIG. 2B for finding a point which gives the lowest engine speed among three points L, H, R1. In the illustrated example, the point L gives the lowest engine speed N1. At this time another average value $\bar{\theta}'$ of the three ignition timings of these points L, H and R1 is computed. A further new point R2 will be found to renew the point L giving the lowest engine speed N1 in such a manner that the new point R2 is set at a point opposite to the point L with respect to the average value point $\bar{\theta}'$. Namely this new point R2 is set so that the engine speed obtained thereby is higher than that of the point L.

The above-mentioned operations are repeated to find a new ignition timing successively as shown in FIG. 2C. In other words, the ignition timing is changed or corrected as R1→R2→R3→R4 in a direction of the engine speed increase. Since the engine speed obtained by a new ignition timing is higher than the engine speed by the old ignition timing, repetition of the above steps results in convergence of the engine speed toward an optimum ignition timing $\theta_{opt}$. In this way the optimum ignition timing point $0_{opt}$ can be found.

Figure 3:
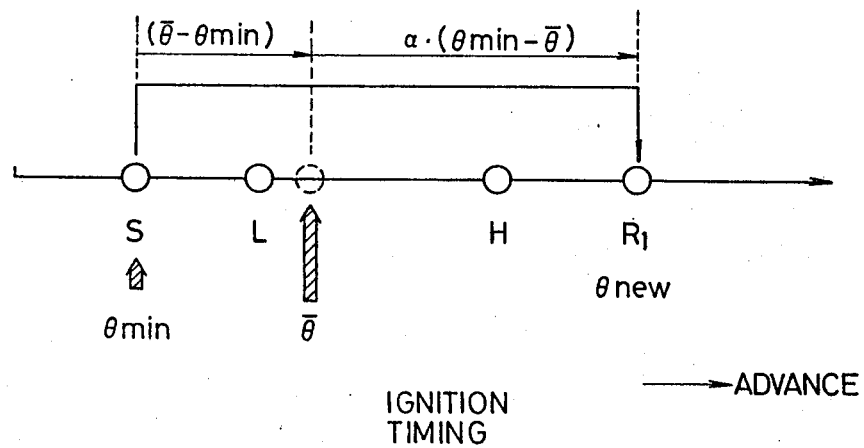
FIG. 3 is an explanatory diagram showing the way of determining an ignition timing for increasing the engine speed from an ignition timing causing the minimum engine rotational speed.

FIG. 3 illustrates the way of finding a new ignition timing point from the original three points H, S and L. The new point is denoted by $\theta_{new}$, which corresponds to the point R1 in FIG. 2A. The average ignition timing $\bar{\theta}$ is given by the following formula:

$$\bar{\theta} = \frac{H + S + L}{3} \quad (1)$$

$$= \frac{\theta_L + (\theta_L + \Delta\theta_1) + (\theta_L + \Delta\theta_2)}{3}$$

$$= \frac{3\theta_L + \Delta\theta_1 + \Delta\theta_2}{3}$$

Assuming that the new ignition timing point R1 substituting for the old ignition timing point $\theta_{min}$ (point S), which gives the lowest engine speed, is expressed by $\theta_{new}$, this new ignition timing is given by:

$$\theta_{new} = \bar{\theta} - \alpha(\theta_{min} - \bar{\theta}) \quad (2)$$

wherein $\alpha$ is a constant.

Figure 4:
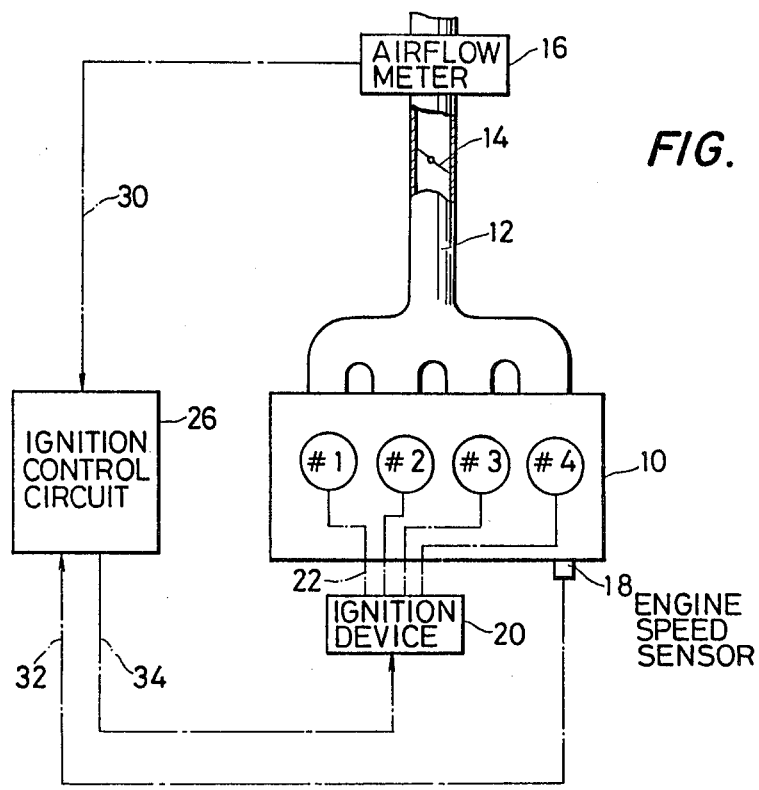
FIG. 4 is a schematic diagram showing the apparatus for controlling ignition timing according to the present invention.

Reference is now made to FIG. 4 which shows apparatus for controlling ignition timing according to the present invention. In FIG. 4, the reference 10 is an internal combustion engine body having four cylinders #1, #2, #3, and #4. Although the present invention is applicable to any internal combustion engine irrespective of the number of cylinders, an embodiment will be described by way of an example of such a four-cylinder engine. It is noted that the ignition timing throughout all the cylinders is identical, and therefore, when changing the ignition timing, it is changed by the same amount throughout all the cylinders. Intake air is led to the respective cylinders via an intake manifold 12, where a throttle valve 14 controls the intake airflow. An airflow meter 16 is provided upstream the throttle valve 14 for measuring the intake airflow. This airflow meter 16, however, may be replaced by an intake pressure sensor. The reference 18 is a rotational speed sensor which produces a signal indicative of the revolution of the engine crankshaft. As this rotational speed sensor 18 may be used a well known crankshaft angle sensor which is arranged to produce a pulse signal when the engine crankshaft assumes a given rotational angle.

The reference 20 is an ignition device comprising an ignitor, a distributor, and an ignition coil, which are not shown. The ignition device 20 is connected via conductors 22 (see dot-dash lines) to spark plugs of respective cylinders.

An ignition control circuit 26 is provided to produce actuation signals to be applied to the ignition device 20. The ignition control circuit 26 comprises a computer programmed to execute steps which will be described later. The above-mentioned intake airflow meter 16 and rotational speed sensor 18 are arranged to supply the ignition control device 26 with their output signals via conductors 30 and 32. Thus, the ignition control circuit 26 calculates an ignition timing which is basically determined by the intake airflow and the engine rotational speed represented by the output signals from the airflow meter 16 and the rotational speed sensor 18. The result of this calculation is fed via a conductor 34 to the ignition device 20 so that ignition timing will be controlled.

Figure 5:
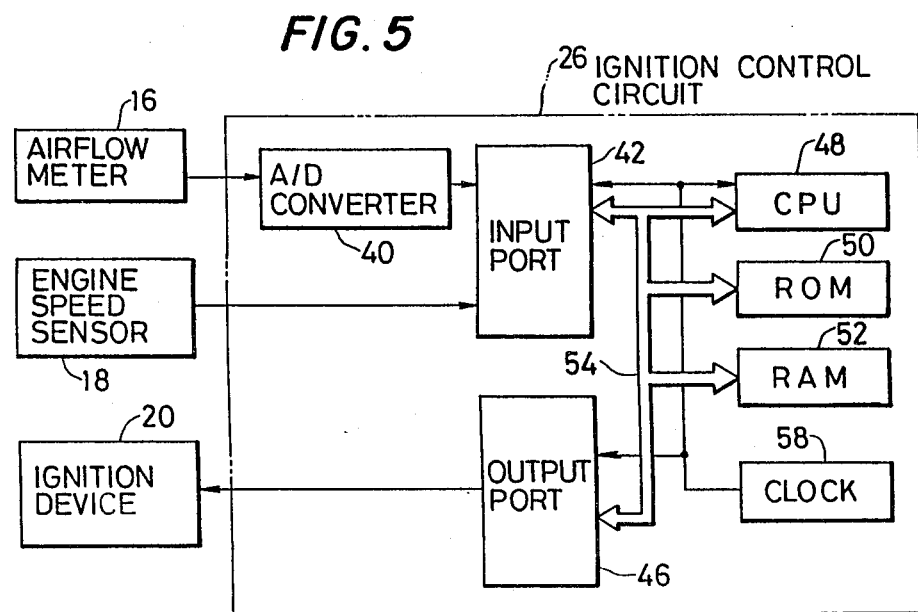
FIG. 5 is a schematic diagram of the ignition control circuit shown in FIG. 5.

FIG. 5 illustrates a block diagram of the ignition control circuit 26 having an A/D converter 40, an input port 42, an output port 46, a CPU 48, a ROM 50, a RAM 52, and a clock generator 58. The input port 42 is used to receive the output signals from the airflow meter 16 and the rotational speed sensor 18. The A/D converter 40 converts an analog signal from the airflow meter 16 or an intake pressure sensor to a digital signal so that the converted digital signal is fed to the input port 42. The output port 46 functions as a signal gate so that the timing of the actuation signal fed to the ignition device 20 will be controlled thereby. The input and output ports 42 and 46 are both connected via a bus 54 to the CPU 48, ROM 50, RAM 52 constituting a computer. Signal transmission between these circuits is effected in synchronism with clock pulses from the clock generator 58.

The ignition control circuit 26 is so programmed that an optimum ignition timing will be obtained as described in the above. The operation of the ignition control circuit 26 will be described with reference to FIG. 6.

Figure 6:
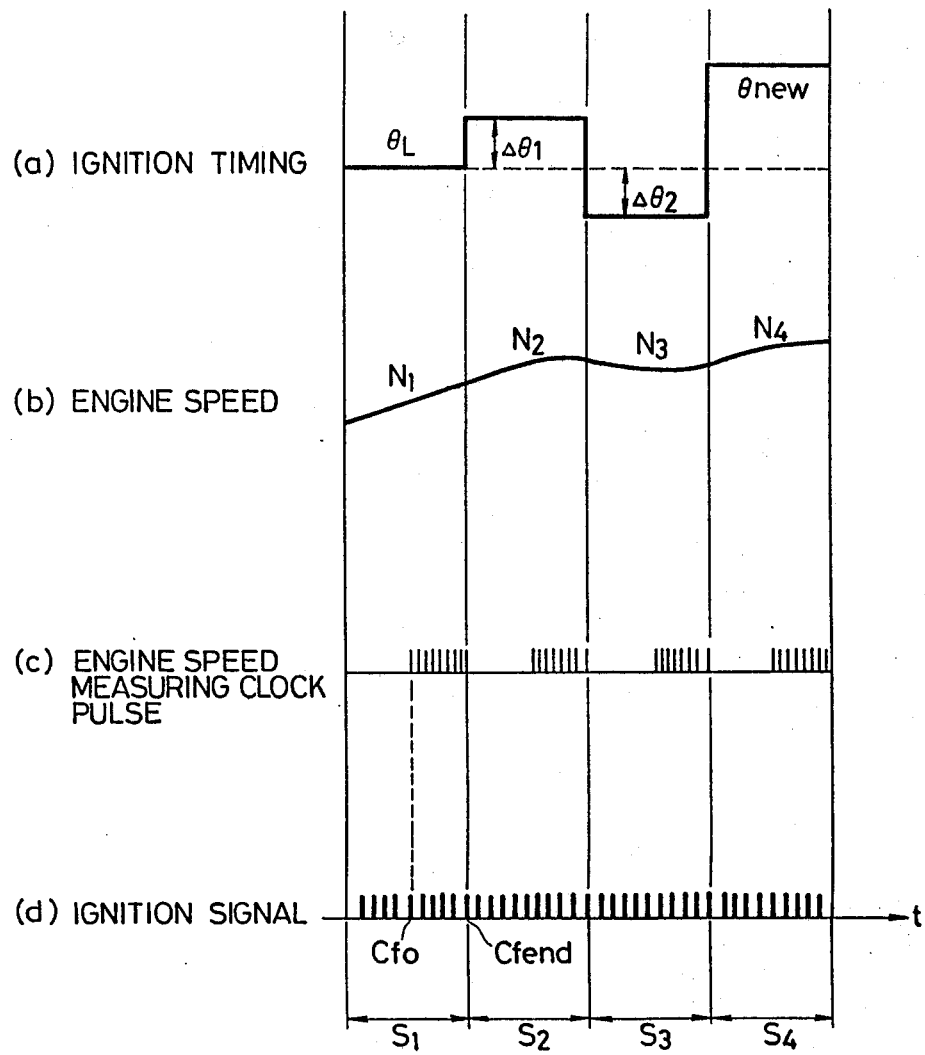
FIG. 6 is a timing chart showing the operating process for obtaining an optimum ignition timing according to the present invention.

At the beginning of calculation, namely in a first step S1, the ignition timing is set to $\theta_L$ as shown in (a) of FIG. 6. Engine operation under this condition causes a change in the engine rotational speed as shown by (b), while ignition pulses are produced and fed to the spark plugs of the cylinders as shown by (d). The clock pulses between predetermined ignition signals Cfo and Cfend around the end of the first step S1 are taken in so that the number thereof is counted as shown by (c). This number of clock pulses between Cfo and Cfend is regarded as the engine speed N1 at the step S1.

In a followng second step S2, the ignition timing is changed to $\theta_L + \Delta\theta_1$. Under this condition the engine is operated for a predetermined period of time so as to measure the engine speed in the same manner as in the first step S1. Namely, the number of clock pulses between Cfo and Cfend in the second step S2 is regarded as the engine rotational speed N2. In this way, another engine speed N3 will be measured in a following third step S3. Furthermore, in a fourth step S4 the ignition timing $\theta_L + \Delta\theta_2$ is replaced with the new ignition timing $0_{new}$ by using the average ignition timing as described with reference to FIG. 3, and the engine is operated with this new ignition timing for a predetermined period of time to measure the engine speed N4 in the same manner as in the above steps. After this, the steps of FIG. 6 are repeated so as to successively renewing ignition timings for finding the optimum ignition timing.

Figure 7B:
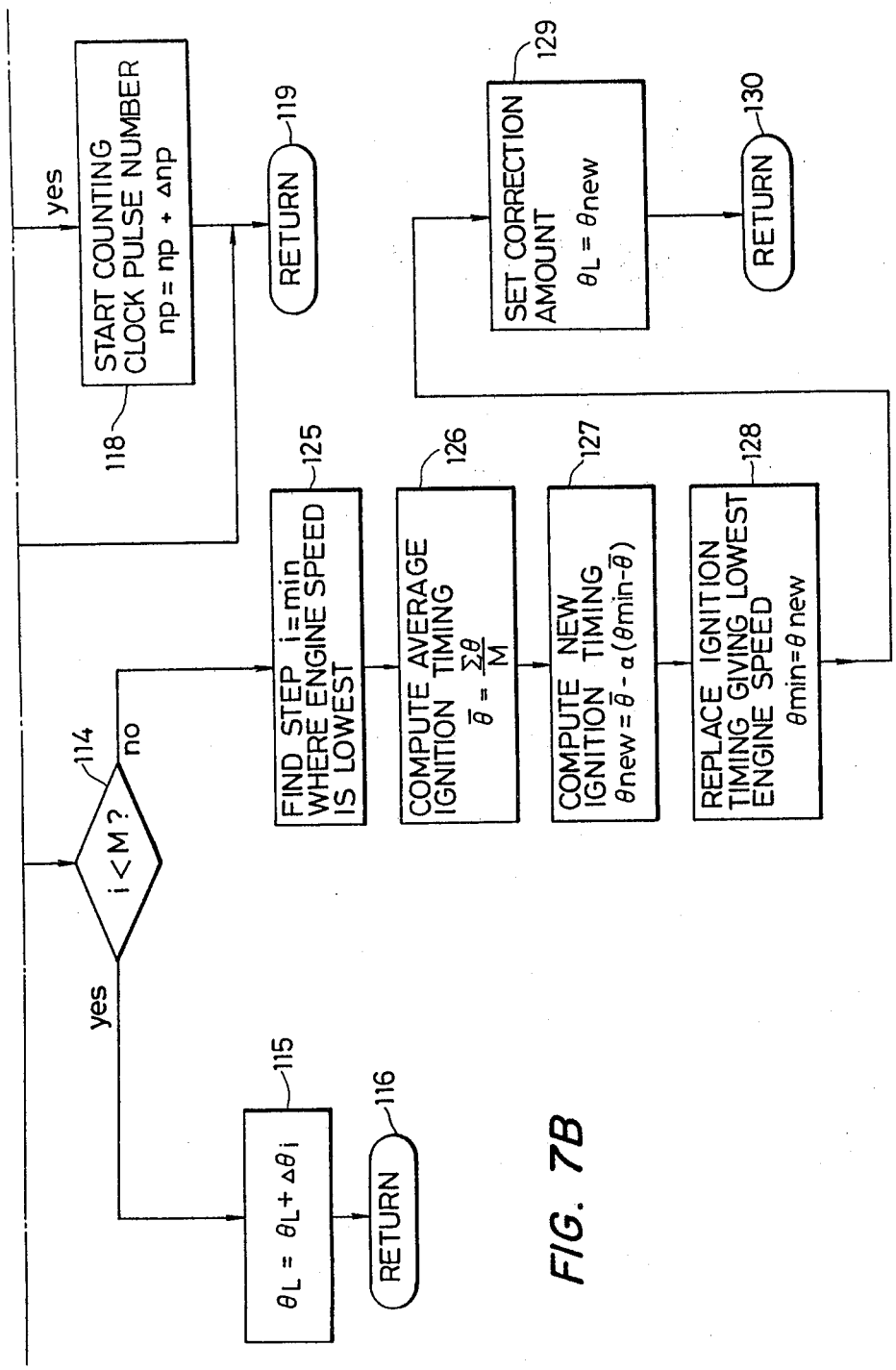

The above-described ignition timing control will be further described in detail with reference to a flow chart of FIG. 7. In the illustrated embodiment, ignition timing control is arranged to be executed by an interrupt service routine. Namely, the computer of FIG. 5 is arranged to execute an unshown main routine normally. An interrupt request is arranged to be produced each time the engine crankshaft assumes a predetermined angle so that the interrupt service routine is repeatedly executed whenever the engine operates. When the engine starts, an interrupt request is applied to the computer so that the operational flow enters into the interrupt service routine of FIG. 7 (see step 100). The interrupt service routine comprises various steps as will be described hereinbelow, but these steps in the program should not be confused with the steps S1, S2 . . . SM of FIG. 6.

In a following step 101, a basic ignition timing $0_B$ is calculated on the basis of the intake airflow data and the engine speed data both fed from the input port 42 of FIG. 5. This calculation is effected such that a most suitable ignition timing is selected from a map stored in the ROM 50 in accordance with the airflow and engine speed data. Nextly, in a step 102, it is detected whether the engine is in steady state or not by detecting the engine speed and the varying rate of the intake vacuum. If the engine is other than the steady state, the answer of the step 102 is NO so that the operational flow proceeds to a step 103. In this step 103, the count i of a step counter, the count Cf of an ignition number counter, the count np of a clock pulse counter, and a flag KEY are all reset to zero or cleared as i=0, Cf=0, np=0, and KEY=0. In a following step 104, the ignition is set as follows:

$$\text{(H)} = \theta_B + \theta_L \qquad (4)$$

wherein $\theta_L$ is a correction amount of the ignition timing, which amount is prestored in a memory so that one correction amount suitable for the combination of the airflow and engine speed will be selected; and $\theta_B$ is the basic ignition timing or advance angle obtained in the step 101.

After the execution of the step 104, the operational flow returns to the unshown main routine from a step 105.

Turning back to the step 102, when the engine is detected to be in steady state, the answer of the step 102 becomes YES, and a step 109 is then exeucted.

In the step 109, the engine is operated with an ignition timing which has been changed from $\theta_B$ by $\theta_L$. Namely, the engine is operated with an ignition timing (H) which corresponds to the point L of FIG. 2A. In other words, the first step S1 of FIG. 6 is executed for measuring engine speed data. In a following step 110, the count Cf of the ignition number counter is added by one each time ignition takes place. In a following step 111, it is detected whether the count Cf of the ignition number counter is greater than Cfend shown in FIG. 6. At the very beginning of the engine operation the answer of the step 111 is NO as a matter of course, and thus a step 117 takes place in which it is detected whether Cf is greater than Cfo. If Cf has not yet reached Cfo, the answer of the step 117 assumes NO so that the operational flow returns to the main routine via a step 119. On the other hand, when Cf is greater than Cfo, namely, when entering into the engine speed measuring time between Cfo and Cfend of FIG. 6, a following step 118 is executed in which the count np of the clock pulse counter is added by $\Delta np$. This means that clock pulse counting is started immediately after entering into the engine speed measuring time. After the step 118 the operational flow returns to the main routine via the step 119.

In this way the number of the clock pulses is counted to detect the engine speed. Turning back to the step 111, when the count Cf becomes greater than Cfend, the answer thereof turns to YES, and thus a step 112 takes place. In this step 112, the count np of the clock pulse counter is stored in a memory, i.e. the RAM 52 of FIG. 5. The value of np at this time indicates the engine speed N1 in the step S1 of FIG. 6. In a following step 113, the count Cf and the count np are both reset to zero (Cf=0, np=0), while the count i of the step counter is added by one (i=i+1). This means that the first step S1 of FIG. 6 has been completed and a second step S2 will be executed.

A step 114 follows the step 113 so that it is detected whether the count i is not greater than M. At this time since i=1, and thus the answer of the step 114 is YES so that the operational flow enters into a step 115 in which the correction amount $\bar{\theta}_L$ is set as follows:

$$\theta_L = \theta_L + \Delta\theta_1$$

After the completion of the step 115, the operational flow returns via a step 116 to the main routine. When the operational flow enters again into the interrupt service routine through the step 100, the steps 109, 110, 111, 117, 118, 119 are executed in the same manner as the above-mentioned first step S1 so that the engine speed N2 in the second step S2 is measured as the number of the clock pulses to be stored in the memory in the step 112. After this, the step 113 takes place to reset the count Cf of the ignition number counter and the count np of the clock pulse counter, while the count i of the step counter is added by one before entering into the third step S3.

In the step 114, the answer is still YES even in the case of a two-cylinder engine. Therefore, the ignition timing correction amount is set in the following step 115 as follows:

$$\theta_L = \theta_L + \Delta\theta_2$$

After this, the operational flow returns to the main routine through the step 116, and the interrupt service routine will be executed again from the step 100 so that steps following the step 106 are executed in the same manner as before to measure the engine speed N3 in the third step S3. This engine speed data N3 is stored in the form of the pulse count np in the memory in the step 112.

Passing through the step 113, the operational flow enters into the step 114 in which decision of i<M is effected. If M=3, it is the first time that the answer of this step 114 becomes NO so that a step 125 takes place. In the step 125, a step i=min, which gives the lowest engine speed, is found. Then a step 126 takes place to calculate the aforementioned average ignition timing $\bar{\theta}$ by using the formula (1).

$$\bar{\theta} = \frac{H + S + L}{3}$$

Then in a step 127 a new ignition timing combination point is calculated on the basis of the average ignition timing point $\bar{\theta}$ obtained in the step 126, by using the aforementioned formula (2):

$$\theta_{new} = \bar{\theta} - \alpha(\theta_{min} - \bar{\theta})$$

The new ignition timing point $\theta_{new}$ is such that it results in increase in engine speed.

In a step 128 following the step 127, the ignition timing $\theta_{min}$ giving the lowest engine speed, i.e. N3 in FIG. 2A, is replaced with the new ignition timing combination $\theta_{new}$. From the above equation, it will be understood that the new ignition timing $\theta_{new}$ is positioned at a point opposite to the point $\theta_{min}$ giving the lowest engine speed with respect to the point of average ignition timing $\bar{\theta}$, while the distance or amount between the average ignition timing $\bar{\theta}$ and the new ignition timing $\theta_{new}$ is $\alpha$ times the distance between the old ignition timing $\theta_{min}$ giving the lowest engine speed and the average ignition timing $\bar{\theta}$. The value $\alpha$ is a positive constant, and is not necessarily a positive integer. Then in a followng step 129, ignition timing correction amount is set. After this the operational flow returns to the main routine through the step 130.

After a new ignition timing has been set as described in the above, similar operations are repeated so that the optimum ignition timing is found.

The above-described embodiments are just examples of the present invention, and therefore, it will be apparent for those skilled in the art that many modifications and variations may be made without departing from the spirit of the present invention.

What is claimed is:

1. A method of controlling ignition timing in an internal combustion engine, comprising the steps of:
    (a) operating said engine with a plurality of different ignition timings to find engine output obtained with each of said ignition timings in such a manner that said engine is operated for a predetermined period of time with each of said ignition timings one after another;
    (b) determining one of the plurality of ignition timings, which gives the lowest engine output;
    (c) computing an average value of the plurality of ignition timings;
    (d) computing a new ignition timing such that the new ignition timing is opposite to the ignition timing giving the lowest engine output with respect to the average value, and that the difference between said average value and said new ignition timing equals a multiple of the difference between the ignition timing giving the lowest engine output and the average value;
    (e) substituing said ignition timing giving the lowest engine output with said new ignition timing so that said steps (a) to (d) are exeucted; and
    (f) repeating said steps (a) to (e) to find an optimum ignition timing.

2. A method as claimed in claim 1, wherein said step of computing the new ignition timing compries the step of executing the following equaltion:

$$\theta_{new} = \bar{\theta} - \alpha(\theta_{min} - \bar{\theta})$$

wherein
   $\alpha$ is a constant;
   $\bar{\theta}$ is the average value; and
   $\theta_{min}$ is the ignition timing giving the lowest engine speed.

3. A method as claimed in claim 1, wherein said engine output is engine speed.

4. Apparatus for controlling ignition timing in an internal combustion engine, comprising:
    (a) first means for producing ignition signals which are respectively fed to spark plugs of the engine cylinders, said first means being capable of producing said ignition signals having different timings from another;
    (b) second means for detecting the engine output;
    (c) third means for detecting engine parameters; and
    (d) fourth means responsive to said second and third means for causing said first means to produce said ignition signals, said fourth means;
    determining a basic ignition timing in view of said engine parameters;
    changing said basic ignition timing so that a plurality of different ignition timings are provided for operating said engine with said plurality of ignition timings;
    determining one of the plurality of ignition timings, which gives the lowest engine output;

computing an average value of the plurality of ignition timings;

computing a new ignition timing such that the new ignition timing is opposite to the ignition timing giving the lowest engine output with respect to the average value, and that the difference between said average value and said new ignition timing equals a multiple of the difference between the ignition timing giving the lowest engine output and the average value; and substituing said ignition timing giving the lowest engine output with said new ignition timing.

5. Apparatus as claimed in claim 4, wherein said second means comprises a pulse generator producing a pulse train indicative of the engine speed.

6. Apparatus as claimed in claim 4, wherein said fourth means comprises a computer having a processor and a memory in which ignition timing data are stored, said computer being arranged to execute an interrupt service routine in response to an interrupt request repeatedly generated.

7. Apparatus as claimed in claim 4, wherein said computer comprises means for counting the number of said different timings so that one of said timings giving the lowest engine output is detected when said engine is operated with a predetermined number of said different timings.

* * * * *